United States Patent
Tyagarajan et al.

(10) Patent No.: US 7,184,541 B2
(45) Date of Patent: Feb. 27, 2007

(54) METHOD AND APPARATUS FOR SELECTING AN AGENT TO HANDLE A CALL

(75) Inventors: NV Tyagarajan, Newtown, CT (US); Rohit Tandon, New Canaan, CT (US); Ajay Kapoor, Scottsdale, AZ (US); Anil Nanduru, Hyderabad (IN)

(73) Assignee: General Electric Capital Corporation, Stamford, CT (US)

( * ) Notice: Subject to any disclaimer, the term of this patent is extended or adjusted under 35 U.S.C. 154(b) by 157 days.

(21) Appl. No.: 10/733,677

(22) Filed: Dec. 11, 2003

(65) Prior Publication Data
US 2005/0129214 A1 Jun. 16, 2005

(51) Int. Cl.
*H04M 3/00* (2006.01)

(52) U.S. Cl. .............. 379/265.02; 379/265.11; 379/265.14

(58) Field of Classification Search ........... 379/265.02, 379/265.11, 265.12, 265.14, 266.01
See application file for complete search history.

(56) References Cited

U.S. PATENT DOCUMENTS

| | | | |
|---|---|---|---|
| 4,881,261 A | 11/1989 | Oliphant et al. | |
| 5,025,468 A | 6/1991 | Sikand et al. | |
| 5,206,903 A * | 4/1993 | Kohler et al. ........... | 379/265.12 |
| 5,299,260 A | 3/1994 | Shaio | |
| 5,467,391 A | 11/1995 | Donaghue, Jr. et al. | |
| 5,592,542 A | 1/1997 | Honda et al. | |
| 5,721,770 A | 2/1998 | Kohler | |
| 5,784,452 A | 7/1998 | Carney | |
| 5,828,747 A | 10/1998 | Fisher et al. | |
| 5,903,641 A | 5/1999 | Tonisson | |
| 5,905,793 A | 5/1999 | Flockhart et al. | |
| 6,044,146 A | 3/2000 | Gisby et al. | |
| 6,222,919 B1 | 4/2001 | Hollatz et al. | |
| 6,278,777 B1 | 8/2001 | Morley et al. | |
| 6,310,951 B1 | 10/2001 | Wineberg et al. | |
| 6,347,139 B1 | 2/2002 | Fisher et al. | |
| 6,424,709 B1 * | 7/2002 | Doyle et al. ........... | 379/265.02 |
| 6,535,600 B1 | 3/2003 | Fisher et al. | |
| 6,563,920 B1 | 5/2003 | Flockhart et al. | |
| 6,577,727 B1 | 6/2003 | Hymel | |
| 6,661,889 B1 * | 12/2003 | Flockhart et al. ...... | 379/265.05 |
| 2002/0101979 A1 | 8/2002 | Borodow et al. | |

OTHER PUBLICATIONS

"Avaya CRM Solution-MultiVantage™ Call Center Solutions", ©2003 Avaya Inc., download from http://www1.avaya.com/enterprise/solutions/crm/solution5.html on Jul. 2, 2003. 2 pgs.

Avaya, "Overview for Avaya MultiVantage™ Software", 555-233-767, Issue 3, May 2002. 69pgs.

* cited by examiner

*Primary Examiner*—Bing Q. Bui
(74) *Attorney, Agent, or Firm*—Buckley, Maschoff & Talwalkar LLC (57) ABSTRACT

A system, method, apparatus, means, and computer program code for selecting an agent to handle a call are provided. According to some embodiments, multiple agents may take or handle calls. Each agent's off process time may be measured or determined. When an incoming call arrives, the available agent having the highest off process time may be selected to handle to the call. In other embodiments, each of the agents may be assigned a priority. When an incoming call arrives, the available agent having the highest priority may be selected to handle the call. In both of the previous embodiments, conditions or rules may be established that allow an agent to be skipped even though the agent normally would be selected to handle a call.

48 Claims, 7 Drawing Sheets

METHOD AND APPARATUS FOR SELECTING AN AGENT TO HANDLE A CALL

FIELD

The present invention relates to a method and apparatus for selecting an agent to handle a call.

BACKGROUND

Call centers often employ multiple agents to handle calls from customers, potential customers, etc. Unfortunately, the number of agents needed for a call center can vary depending on many factors such as, for example, time of day, day of week, occurrence of a holiday, product, number of callers or potential callers, needs or requirements of a client the call center is providing service for, geographic dispersion of customer base, etc. Unfortunately, it may be difficult for a call center to have exactly the right number of agents available to handle the incoming calls. Thus, the call center may have too few or too many agents available at any given time. In addition, in some circumstances a call center may want to have idle agents perform other tasks instead of waiting for an incoming call. However, it may be difficult to know in advance when an agent may have sufficient idle time to perform another task. Also, the time spent in switching between tasks reduces the time the agent has available to perform the tasks and reduces the efficiency of the call center.

It would be advantageous to provide a system, method, apparatus, means and computer code that enabled agents to be selected to handle calls in a manner that increased their efficiency and increased the ability of some of the agents to perform other tasks.

SUMMARY

Embodiments provide a system, method, apparatus, means, and computer program code for selecting an agent to handle a call. According to some embodiments, multiple agents may be available or used to take or handle calls. Each agent's off process time may be measured or determined. When an incoming call arrives, the available agent having the highest off process time may be selected to handle the call. In other embodiments, each of the agents may be assigned a priority. When an incoming call arrives, the available agent having the highest priority may be used or selected to handle the call. In both of the previous embodiments, conditions or rules may be used or established that allow an agent to be skipped even though the agent normally would be selected to handle a call. For example, if an agent is currently available but has an on process time exceeding a designated threshold, the agent may be skipped even though the agent is not currently handling a call. As another example, in some embodiments, an agent who has handles a large number of calls may be skipped even if the agent is not currently handling a call.

In some embodiments, agents may be separated into multiple groups to handle calls. For example, agents may be divided into a primary group and a secondary group. All incoming calls may be handled by the primary group according to one of the methods described herein. When call volume or call numbers exceeds a threshold, if wait time for answering incoming calls exceeds a threshold, or if some other criteria is met, one or more agents from the secondary group may start handling calls or be used to augment the primary group. Agents from the secondary group may be selected according to one or the methods described herein. Such agents from the secondary group may stop handling calls when conditions change and/or they are no longer needed to handle calls.

Additional advantages and novel features shall be set forth in part in the description that follows, and in part will become apparent to those skilled in the art upon examination of the following or may be learned by the practice of the invention.

According to some embodiments, a method for selecting an agent for a call may include determining an off process time for each of a plurality of agents; and routing an incoming call to a first available agent in the plurality of agents, wherein the first available agents has an off process time that is higher than other available agents in the plurality of agents. In some other embodiments, a method for selecting an agent for a call may include assigning a priority to each of a plurality of agents; and routing an incoming call to a first available agent in the plurality of agents, wherein the first available agents has a priority that is higher than other available agents in the plurality of agents. In some further embodiments, a method for selecting an agent for a call may include establishing a first group of agents; establishing a second group of agents; routing an incoming call to an available agent in the first group of agents if an available agent exists in the first group of agents or routing the call to an available agent in the second group if no available agents exist in the first group.

In some embodiments, means, computer code, systems, and apparatus may implement one or more elements of one or more of the methods disclosed herein.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate embodiments, and together with the descriptions serve to explain the principles of the invention.

DETAILED DESCRIPTION

Applicants have recognized that there is a market opportunity for systems, means and methods that allow selection of an agent to handle an incoming call. There may be multiple agents available to handle an incoming call.

According to some embodiments, the off process time for an agent may be measured or determined. In some embodiments, off process time for an agent may include the agent's idle time, hold time, and/or other predefined or designated times when the agent is off the phone. Off process time for an agent may be measured or otherwise determined continuously, periodically, when an incoming call arrives, or in accordance with another designated plan or schedule. In some embodiments, off process time may be measured for a designated time interval. For example, agents' off process time may be measured in or related to half hour blocks. As another example, off process time may be measured for an agent relative to a previous amount of time (e.g., the previous twenty minutes). When an incoming call arrives, the available agent having the highest off process time may be selected to handle to the call. In other embodiments, each of a multiple agents may be assigned a priority. When an incoming call arrives, the available agent having the highest priority may be selected to handle the call.

In both of the previous embodiments, conditions or rules may be established that allow an available agent to be skipped even though the agent normally would be selected to handle a call. This may occur when the agent has been handling one or more calls for a long period of time. For example, if an agent is currently available but has an on process time exceeding a designated threshold, the agent may be skipped even though the agent is not currently handling a call. As another example, in some embodiments, an agent who has handles a large number of calls may be skipped even if the agent is not currently handling a call. In some embodiments, such skipping conditions or rules may be measured in or related to a designated time interval. For example, if during the current time block, a currently available agent has taken twenty calls or has been handling telephone calls for greater than ninety-five percent of the time, the agent may be skipped and not handle the next incoming call, even though the agent would normally have been the agent selected to handle the call.

In some embodiments, agents may be separated into multiple groups to handle calls. Agents in different groups may be assigned or expected to handle different assignments. For example, agents may be divided into a primary group and a secondary group. All incoming calls may be handled by the primary group according to one of the methods described above or otherwise herein. When call volume or call numbers exceeds a threshold, if wait time for answering incoming calls exceeds a threshold, or if some other designated criteria is met or event occurs, one or more agents from the secondary group may be selected to start handling calls or to otherwise support the primary group. Agents from the secondary group may be selected according to one or the methods described herein. If needed, additional agents from the secondary group may be assigned to handle calls. Agents from the secondary group can stop handling calls when time or conditions permit. Agents in the secondary group who are not handling calls be assigned other tasks. Thus, the agents in the primary group are used to handle calls and agents in the second group are used to perform other tasks but are available to handle calls if needed.

These and other features and advantages will be discussed in further detail below, by describing a system, individual devices, and processes according to embodiments of the invention. Among other things, the invention provides a technical effect of improving agent selection and call distribution within a call center.

System

Figure 1:
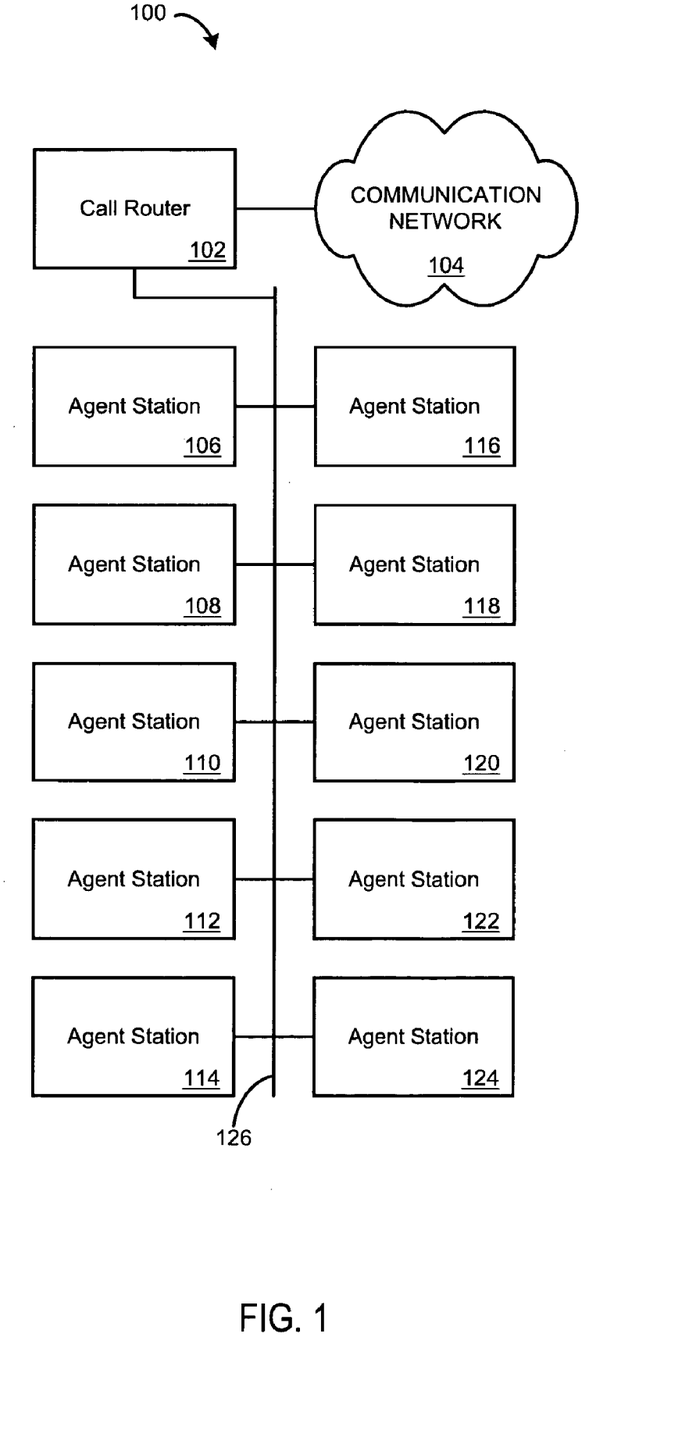
FIG. 1 is a block diagram of a representative system.

Now referring to FIG. 1, a representative apparatus or system 100 usable with the methods disclosed herein is illustrated. The system 100 includes a call router device 102 directly or indirectly connected to or in communication with a communication network 104. The call router device 102 also may be in communication with one or more agent stations 106, 108, 110, 112, 114, 116, 118, 120, 122 and 124 via network 126. In some embodiments, one or more of the agent stations 106, 108, 110, 112, 114, 116, 118, 120, 122 and 124 might not be used and/or may be located remotely from the other agent stations. In some embodiments, the system 100 may include other devices (e.g., database server) or hardware/software components. The devices shown in FIG. 1 need not be in constant communication. For example, an agent station may communicate with the call router 102 only when such communication is appropriate or necessary.

Many different types of implementations or hardware/software configurations can be used in the system 100 and with the methods disclosed herein and the methods disclosed herein are not limited to any specific hardware/software configuration for the system 100 or any of its components.

In some embodiments, the call router 102 may be or include a server, computer, computer system, workstation, host or mainframe, and/or other devices or hardware/software components. In addition, the call router 102 may include any needed software to implement one or more of the methods described herein.

In some embodiments, the communications network 104 might be or include the Internet, the World Wide Web, or some other public or private computer, cable, telephone, client/server, cellular, peer-to-peer, or communications network or intranet. The communications network 104 illustrated in FIG. 1 is meant only to be generally representative of a cable, computer, telephone, peer-to-peer or other communication networks for purposes of elaboration and explanation of the invention and other devices, networks, etc. may be connected to the communications network 104 without departing from the scope of the invention. In some embodiments, the communications network 104 may include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

In some embodiments, the communication network 126 may be or include a local area network, a wide area network, and/or one or more of the components described above for the network 104.

In some embodiments, one or more of the agent stations 106, 108, 110, 112, 114, 116, 118, 120, 122, 124 may be or include a server, computer, computer system, workstation, host or mainframe, and/or other devices or hardware/software components. In addition, an agent stations may include hardware and software needed for an agent to handle an incoming call and/or perform other tasks. For example, an agent station may include a headset or telephone and/or include or have access to a database to retrieve or update information regarding callers, scripts to be used in taking a call, product information, operating procedures, task assignments, etc.

Process Description

Figure 2:
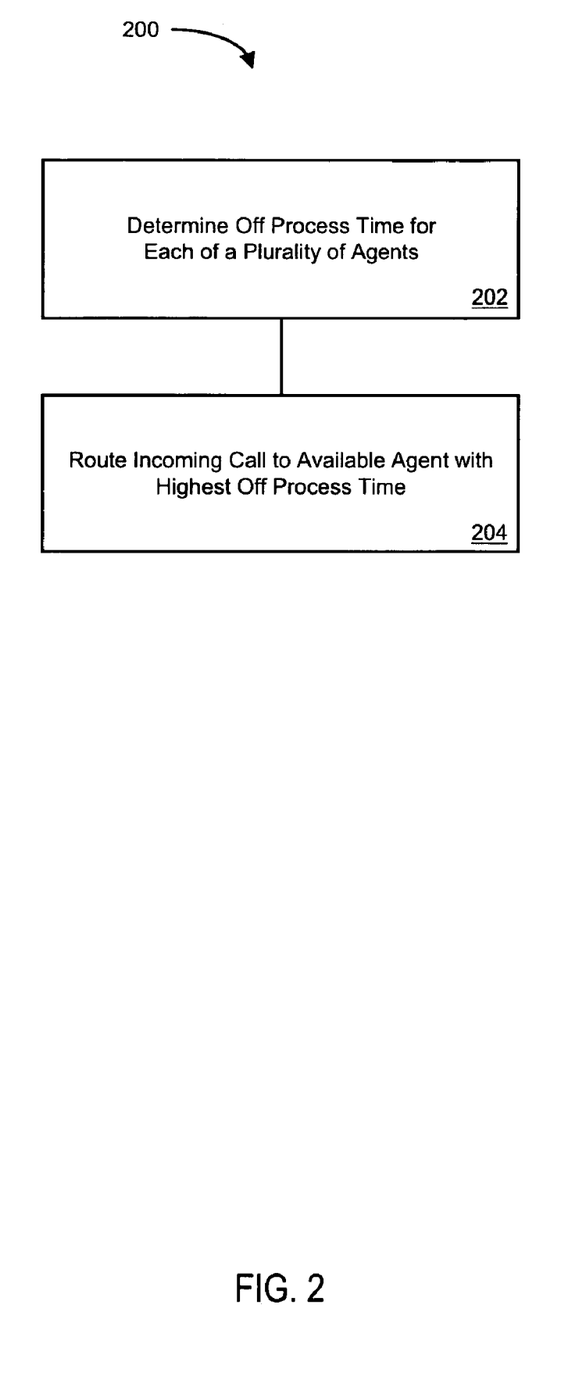
FIG. 2 is a flowchart of a first embodiment of a method.

Reference is now made to FIG. 1, where a flow chart 200 is shown which represents the operation of a first method embodiment. The particular arrangement of elements in the flow chart 200 is not meant to imply a fixed order to the elements; embodiments can be practiced in any order that is practicable. In some embodiments, some or all of the elements of the method 200 may be performed or completed by the call router 102 and/or another device, as will be discussed in more detail below.

Processing begins at a step 202 during which the call router 102 measures, monitors, or otherwise determines off process time and/or on process time for each of a plurality of agents. Agents may be positioned at or associated with one or more of the agent stations 106, 108, 110, 112, 114, 116, 118, 120, 122, 124. In some embodiments, 202 may occur continuously, periodically, after a call has arrived, when an agent is needed to handle an incoming or new call, upon request, at designated times, after designated events occur, etc.

In some embodiments, the method 200 may include receiving an incoming call, determining that selection of an agent is needed, determining that routing of a telephone call to an agent is needed, etc.

In some embodiments, off process time for an agent may include the agent's idle time, hold time, and/or other pre-defined or designated times when the agent is off the telephone or otherwise is not handling a call. In some embodiments, the hold time may be considered as part of the agent's on process time as opposed to part of the agent's off process time. Off process time for an agent may be measured or otherwise determined continuously, periodically, when an incoming call arrives, when an agent is needed, or in accordance with another designated plan or schedule. In some embodiments, off process time may be measured for a designated time interval. For example, agents' off process time may be measured in or related to half hour blocks. That is, assume a new half hour block starts at 1:00 PM. At 1:15, an agent's off process time may be two minutes out of the fifteen minutes that have elapsed since the new time block started. At 1:25 PM, the agent's office process time may be four minutes out of the first twenty-five minutes in the current time block. At 1:30, a new half hour time block may start and off process times for each of the agents may be reset to zero.

In some embodiments, off process time may be measured or determined relative to a previous time period. For example, measuring or determining off process time may be or include determining the off process time for one or more agents during the last ten minutes. Each time the off process time is measured for one or more agents, it may be determined relative to or for the previous ten minute period of time.

During 204, the call router 102 routes or otherwise provides an incoming call to an available agent having the highest off process time as determined during 202. By distributing incoming calls based on off process time, agents in a group may be used more efficiently. As another variation, the call router 102 may route or provide the incoming call to an available agent having the lowest on process time.

As will be discussed in more detail, in some embodiments an available agent who normally would have been selected to handle a call may be skipped and the next agent meeting the selection criteria may be used to handle the call.

Figure 3:
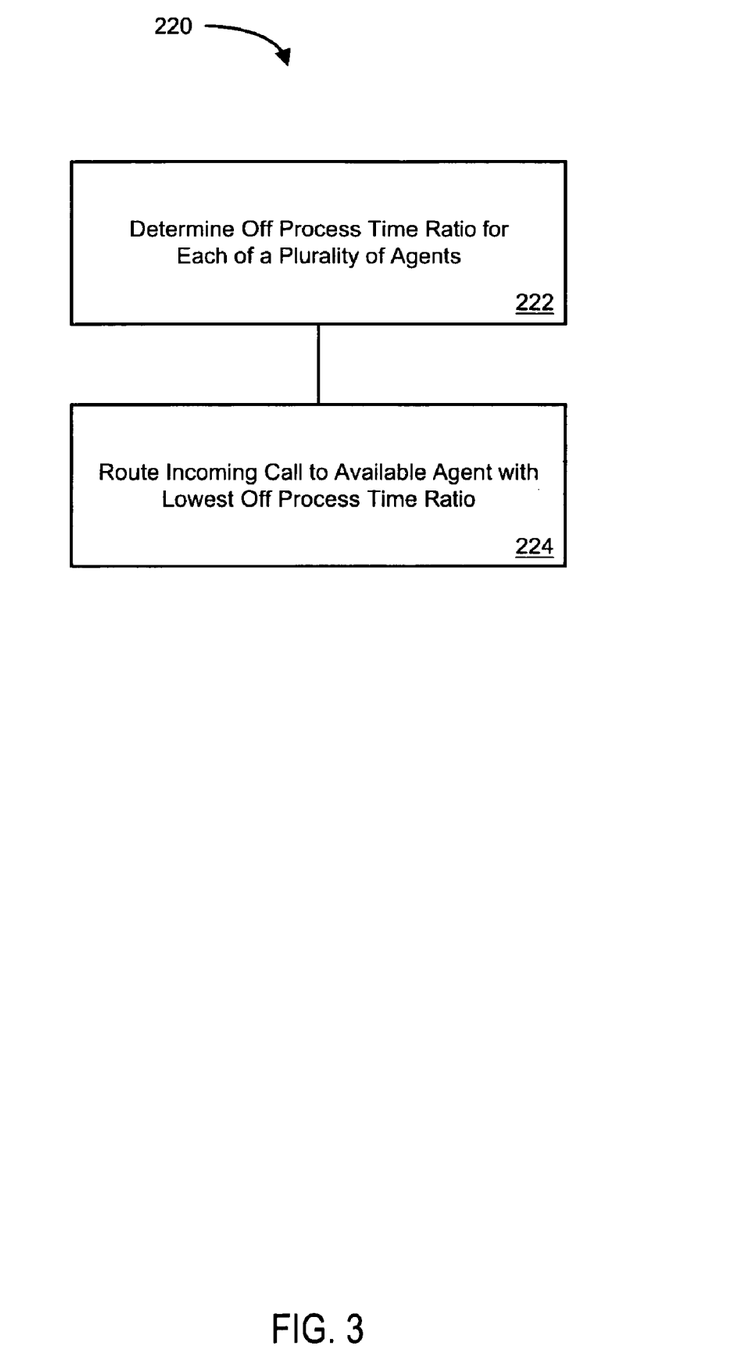
FIG. 3 is a flowchart of a second embodiment of a method

Reference is now made to FIG. 3, where a flow chart 220 is shown which represents the operation of a second method embodiment. The particular arrangement of elements in the flow chart 220 is not meant to imply a fixed order to the elements; embodiments can be practiced in any order that is practicable. In some embodiments, some or all of the elements of the method 220 may be performed or completed by the call router 102 and/or another device, as will be discussed in more detail below.

Processing begins at a step 222 during which the call router 102 measures, monitors, or otherwise determines off process time ratio for each of a plurality of agents. Agents may be positioned at or associated with one or more of the agent stations 106, 108, 110, 112, 114, 116, 118, 120, 122, 124. In some embodiments, 222 may occur continuously, periodically, after a call has arrived, when an agent is needed to handle an incoming or new call, upon request, at designated times, after designated events occur, etc.

In some embodiments, the method 220 may include receiving an incoming call, determining that selection of an agent is needed, determining that routing of a telephone call to an agent is needed, etc.

In some embodiments, an off process time ratio for an agent may be calculated as the on process time for the agent divided by the total available time for the agent. An on process time for an agent may be equal to the agent's talk time plus hold time plus after call work time. The total available time for the agent may be the total time that the agent is potentially available to take a call. For example, the on process time for an agent may be measured for a current thirty minute interval or block of time. The available time then would be thirty minutes. If the thirty minute interval is only seventeen minutes old, the total available time might be seventeen minutes while the on process time for the agent will be seventeen minutes or less. Thus, the on process time ratio is between zero and one inclusively.

Figure 4:
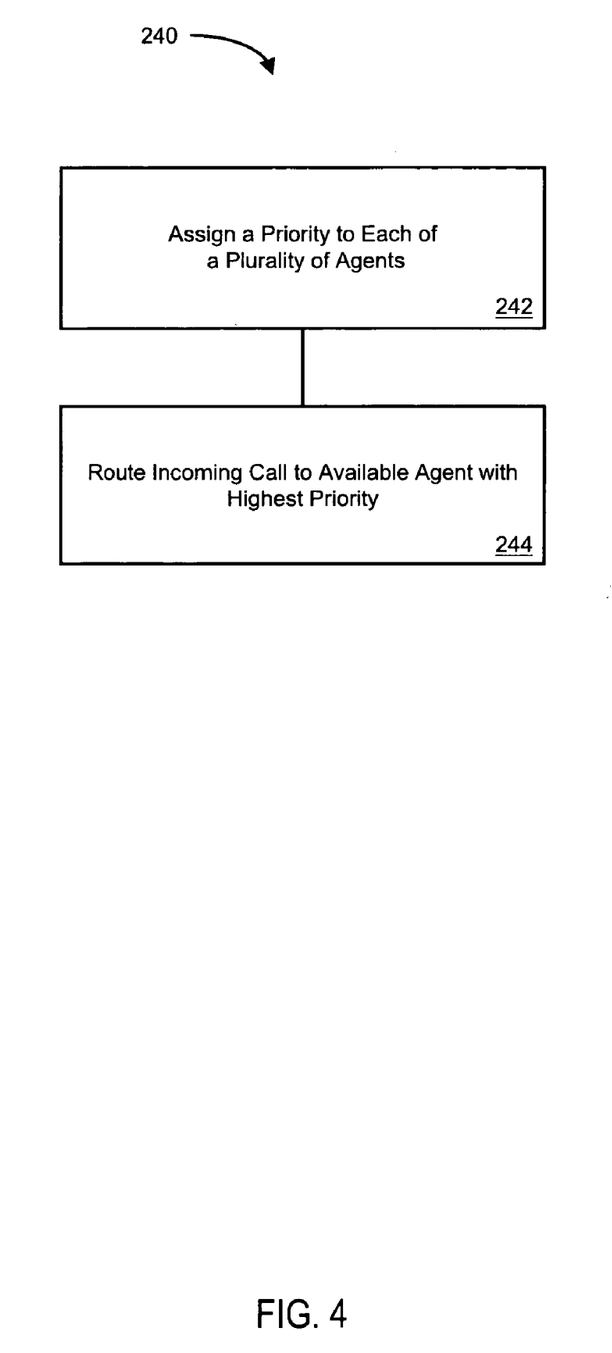
FIG. 4 is a flowchart of a third embodiment of a method.

During 224, the call router 102 routes or otherwise provides an incoming call to an available agent having the lowest off process time ratio as determined during 222. By distributing incoming calls based on off process time ratio, agents in a group may be used more efficiently. As another variation, the call router 102 may route or provide the incoming call to an available agent having the highest on process time ratio (e.g., off process time for an agent divided by available time for the agent). Reference is now made to FIG. 4, where a flow chart 240 is shown which represents the operation of a third method embodiment. The particular arrangement of elements in the flow chart 240 is not meant to imply a fixed order to the elements; embodiments can be practiced in any order that is practicable. In some embodiments, some or all of the elements of the method 240 may be performed or completed by the call router 102 and/or another device, as will be discussed in more detail below.

During 242, the call router 102 assigns a different priority to each of a plurality of agents. For example, if ten agents were on duty, the call router 102 may assign priority numbers one through ten to the ten agents, with one being the highest priority and ten being the lowest priority.

In some embodiments, priority levels or numbers may be based on one or more rules, procedures, criterion, factors, etc. For example, priority may be based on seniority, skill level, or experience of agents, with the most experienced agent getting the highest priority. A new agent may be given a lower priority to give the agent more time between calls to review previous calls, study information, learn procedures, etc.

As another example, agent priority may be assigned randomly each day, each shift, each time period, etc. for agents in a call center. As another example, agent priority for a new time period may be based on the off process time for agents during a previous time period. An agent who had the lowest off process time during a previous time period may be assigned the lowest priority for the new time period in order to give the agent more rest or off process time during the new time period.

During 244, the call router 102 routes or otherwise provides an incoming call to the available agent having the highest priority as established during 242. By distributing incoming calls based on priority levels, agents in a group may be used more efficiently. In addition, off process times will be lower for the agents having the highest priority and higher for the agents having the lowest priority. Thus, agents with a lower priority may be expected to be less busy and/or available to handle other tasks and calls will tend to be routed to higher priority agents.

In some embodiments, the method 240 may include receiving an incoming call, determining that selection of an agent is needed, determining that routing of a telephone call to an agent is needed, etc.

In some embodiments, the methods 200 and 240 may include skipping an available agent to handle a call, even though the agent normally would have been selected to handle the call. For example, if an agent has taken a large number of calls during a time period, has had little or no off process time, or has had on process time or an has an on process time ratio that exceeds a threshold amount or percentage, the call router 102 may skip the agent and let another agent handle an incoming call. In this manner, agents are allowed to have some off process time, which may include having some off process time during each time period. This may reduce fatigue for the agents who handle a large number of calls or who typically have a low off process time and/or at least allow them a break from being on process continuously. For example, each agent may be allowed to have two minutes of off process time during each thirty minute time interval.

In some embodiments, the methods 200 and 240 may include establishing or otherwise determining one or more rules, criterion, procedures, etc. for skipping an available agent, establishing a maximum or threshold on process time for an agent during a time period, establishing a minimum or threshold off process time needed for each agent during a time period, etc. In addition, in some embodiments, the methods 220 and 240 may include skipping an otherwise available agent so that the agent does not handle or is not assigned the next incoming call.

Figure 5:
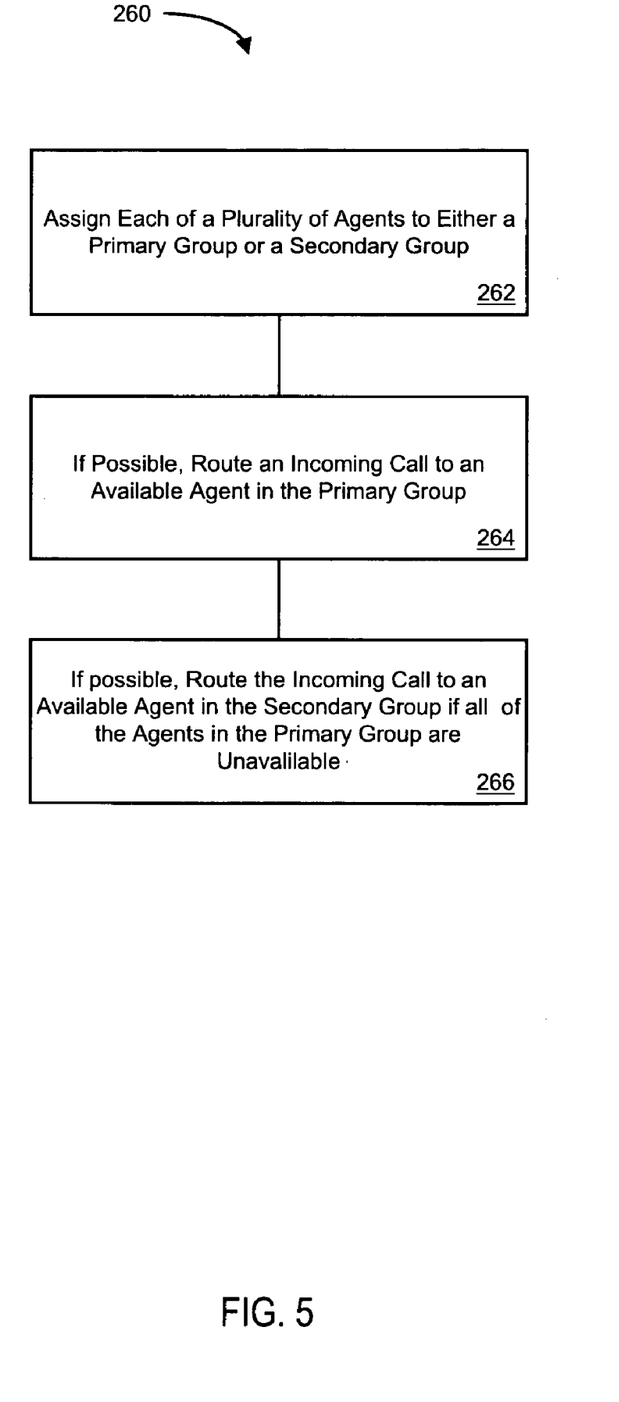
FIG. 5 is a flowchart of a fourth embodiment of a method.

Reference is now made to FIG. 5, where a flow chart 260 is shown which represents the operation of a fourth method embodiment. The particular arrangement of elements in the flow chart 260 is not meant to imply a fixed order to the elements; embodiments can be practiced in any order that is practicable. In some embodiments, some or all of the elements of the method 260 may be performed or completed by the call router 102 and/or another device, as will be discussed in more detail below.

During 262, each of a plurality of agents are assigned to one of multiple groups. For example, agents may be assigned to a primary group (also referred to herein as a core group) or a secondary group (also referred to herein as a support group). In some embodiments, assignment of agents to different groups may be done in accordance with one or more rules, procedures, factors, criterion, etc. (see previous discussion of priority assignment above) or may occur randomly.

During 264, if an agent is available in the primary group, the call router 102 routes an incoming call to the agent. In some embodiments, 264 may use or incorporate the method 200, the method 220, or the method 240 previously discussed above. That is, calls may be routed to agents in the primary group based on off process time, on process time ratio, or assigned priority level.

During 266, if no agent is available in the primary group, the call router routes a call to an agent in the secondary group. In some embodiments, 264 may use or incorporate the method 200 or the method 240 previously discussed above. That is, calls may be routed to agents in the secondary group based on off process time or assigned priority level. Thus, agents in the secondary group can temporarily augment or support the agents in the primary group.

In some embodiments, if no agents are available in the secondary group, the incoming call may be placed on hold until agent becomes available in the secondary group, an agent becomes available in the primary group, or an agent becomes available in either the primary group or the secondary group. As another alternative, in some embodiments, if no agents are available in the secondary group, the incoming call may be routed to an agent in a tertiary group (e.g., another support group). An agent in the tertiary support group may be selected in accordance with priorities assigned to agents in the group, on process time, off process time ratio, or other procedures or algorithms.

In some embodiments, if the method 240 is used to select agents in the primary group and, if needed, in the secondary group, the agent having the highest priority in the secondary group may have a priority that is lower than the priority of the agent in the primary group having the lowest priority among agents in the primary group. In this way, a call will first be routed to an agent in the primary group instead of an agent in the secondary group if an agent in the primary group is available to take the call.

In some embodiments, an agent may be considered unavailable if the agent currently is handing a call, the agent's off process time is too low, the agent's on process time is too high, or as the result of one or more rules, procedures, etc. Thus, if utilization of the agents in the primary group becomes too high, one or more agents from the secondary group may be used to handle incoming calls. If call utilization of agents in the primary group drops, the agent(s) in the secondary group might not be used to handle any additional calls.

In some embodiments an incoming call may be put on hold for the primary group and only transferred or routed to an agent in the secondary group if no other agent in the primary group becomes available for a designated wait or hold time. Thus, determining availability of an agent in the primary group to handle the new call may be or include waiting a designated time to see if an agent in the primary group becomes available to handle the new call.

In some embodiments, an incoming call may be routed to an agent in the secondary group if the expected time to answer (TTA) for every agent in the primary group exceeds a designated amount, number, or threshold. The call router 102 may calculate the time to answer for a call the moment the call hits the system 100 or arrives at the call router 102. The time to answer may represent the amount of time (e.g., number of seconds) after which an agent in the primary group will be available to take the call or after an agent in the primary group is expected to be available to take the call. The time to answer may be based on historical patterns, predicted wait times, or designated algorithm or formula. A call center may use different TTAs for different clients, different service level requirements, different average speed of answer goals, etc.

In some embodiments, the method 260 may include receiving an incoming call, determining that selection of an agent is needed, determining that routing of a telephone call to an agent is needed, stopping the routing of calls to agents in the secondary group, determining that agents in the secondary group are no longer needed to handle calls, etc.

As illustrated by the discussion above, several different implementations are possible. For example, in some embodiments, agents may be associated with either a primary group or a secondary group. Each agent in the secondary group may be assigned a priority. Off process time or off process time ratio may be measured or monitored for each agent in the primary group. When a call arrives, the call may be routed to the available agent in the primary group having the greatest or largest amount of off process time (e.g., the lowest off process time ratio) among available agents in the primary group. For example, the available agent in the primary group having the highest off process time in the past fifteen minutes may be selected to handle the call. If no agents are available in the primary group, the available agent in the secondary group having the highest priority can be selected to handle the call and the call can be routed to such agent in the secondary group. If additional calls arrive while no available agents exist in the primary group, the calls can be routed to available agents in secondary group selected based on their assigned priorities. Once agents in the primary group become available, new calls can be routed to them instead of to agents in the secondary group. In this manner, the agent in the secondary group having the lowest priority will be used the least amount of time to handle calls and may be assigned one or more other tasks. If utilization of the agents in the primary group is low, then one or more of the agents in the primary group can be moved to the secondary group and assigned other tasks.

As another example, agents may be assigned to one or more groups. Calls may be routed to agents in a primary group based on the agents' off process time ratios. If no agents are available in the primary group, the available agent in the secondary group having the highest priority can be selected to handle the call and the call can be routed to such agent in the secondary group. If additional calls arrive while no available agents exist in the primary group, the calls can be routed to available agents in secondary group selected based on their assigned priorities.

As another example, agents in the primary group may be assigned priorities. When a new call arrives, the available agent in the primary group having the highest priority among available agents in the primary group can be selected to handle the call. If no agents in the primary group are available, an agent from the secondary group can be selected as discussed in the previous example.

Figure 6:
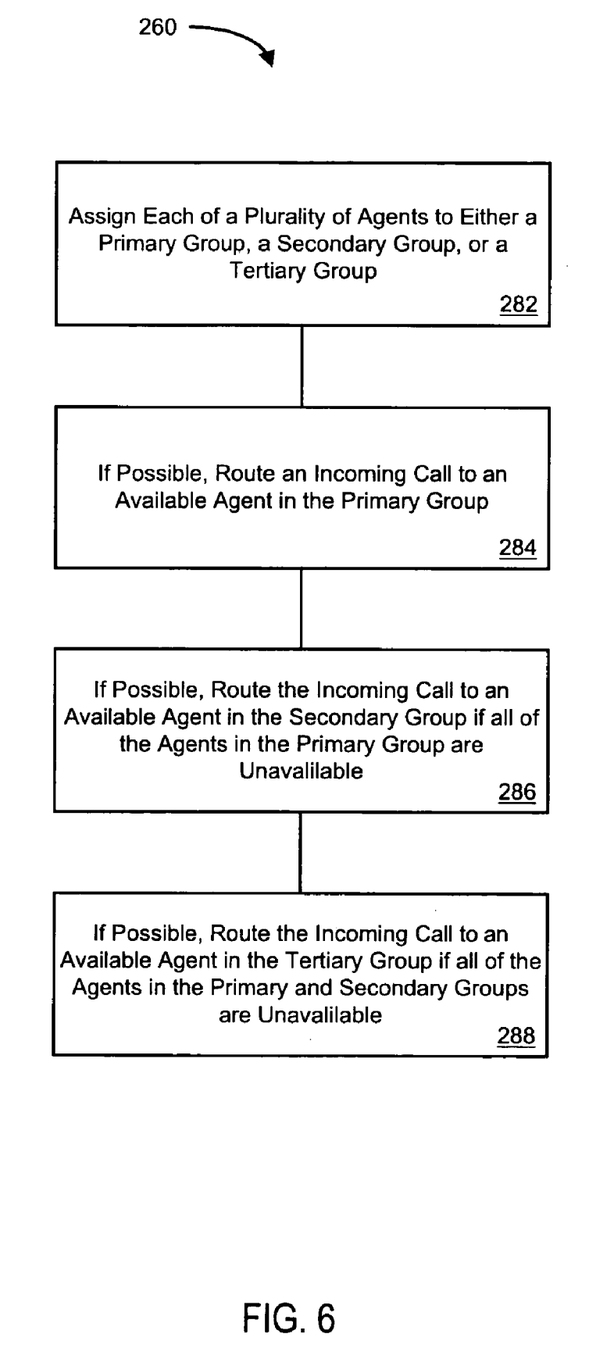
FIG. 6 is a flowchart of a fifth embodiment of a method.

Reference is now made to FIG. 6, where a flow chart 280 is shown which represents the operation of a fifth method embodiment. The particular arrangement of elements in the flow chart 280 is not meant to imply a fixed order to the elements; embodiments can be practiced in any order that is practicable. In some embodiments, some or all of the elements of the method 280 may be performed or completed by the call router 102 and/or another device, as will be discussed in more detail below.

Processing begins at 282 during which each of a plurality of agents is assigned to a primary group, a secondary group, or a tertiary group. The primary group may function as the core group of agents while the secondary and tertiary groups may function as support groups for the primary group. That is, calls will be routed to agents within the primary group when possible and to agents in the secondary or tertiary group when necessary. In some embodiments, assignment of agents to different groups may be done in accordance with one or more rules, procedures, factors, criterion, etc. or may occur randomly.

During 284, if an agent is available in the primary group, the call router 102 routes an incoming call to the agent. In some embodiments, 284 may use or incorporate the method 200, the method 220, or the method 240 previously discussed above. That is, calls may be routed to agents in the primary group based on off process time, on process time ratio, or assigned priority level.

During 286, if no agent is available in the primary group, the call router 102 routes a call to an agent in the secondary group. In some embodiments, 286 may use or incorporate the method 200, the method 220 or the method 240 previously discussed above. That is, calls may be routed to agents in the secondary group based on off process time or assigned priority level. Thus, agents in the secondary group can temporarily augment or support the agents in the primary group.

In some embodiments, an incoming call may be routed to an agent in the secondary group if the expected time to answer for every agent in the primary group exceeds a designated amount, number, or threshold. For example, the call router 102 may calculate the time to answer for a call the moment the call hits the system 100 or arrives at the call router 102. If the time to answer for the agents in the primary group exceeds twenty-five seconds and no agent in the primary group is available, the call router 102 may try to find an agent in the secondary group to route the call to for handling.

During 288, if no agent is available in the primary group or the secondary, the call router 102 routes a call to an agent in the tertiary group. In some embodiments, 286 may use or incorporate the method 200, the method 220 or the method 240 previously discussed above. That is, calls may be routed to agents in the tertiary group based on off process time or assigned priority level. Thus, agents in the tertiary group can temporarily augment or support the agents in the primary group and the secondary group.

In some embodiments, an incoming call may be routed to an agent in the tertiary group if the expected time to answer for every agent in the primary group exceeds a designated amount, number, or threshold and no agents are available in the secondary group to handle the call. For example, the call router 102 may calculate the time to answer for a call the moment the call hits the system 100 or arrives at the call router 102. If the time to answer for the agents in the primary group exceeds thirty-five seconds and no agent in the primary group or the secondary group is available, the call router 102 may try to find an agent in the tertiary group to route the call to for handling.

In some embodiments, if no agents are available in the tertiary group, the incoming call may be placed on hold until agent becomes available in the tertiary group, an agent becomes available in the primary group, an agent becomes available in either the primary group or the secondary group, or an agent becomes available in the primary, secondary, or tertiary groups. As another alternative, in some embodiments, if no agents are available in the tertiary group, the incoming call may be routed to an agent in yet another group (e.g., another support group). An agent in the new support group may be selected in accordance with priorities assigned to agents in the group, on process time, off process time ratio, or other procedures or algorithms.

Call Router Device

Figure 7:
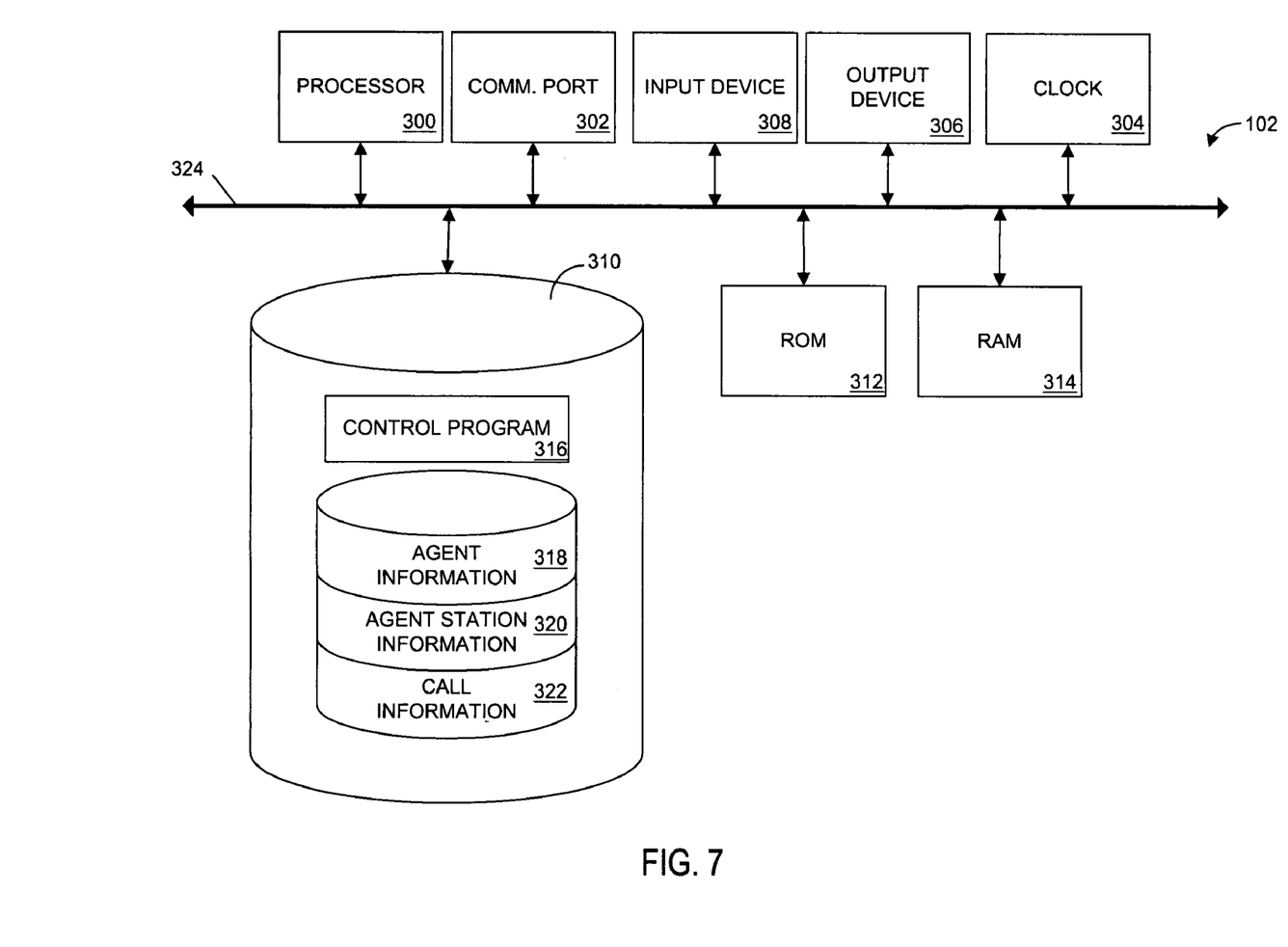
FIG. 7 is a block diagram of system components for an embodiment of the call router of FIG. 1.

Now referring to FIG. 7, a representative block diagram of a call router 102 is illustrated. As previously discussed above, the call router 102 may be adapted to implement one or more elements of the methods described herein.

The call router 102 may include a processor, microchip, central processing unit, or computer 300 that is in communication with or otherwise uses or includes one or more communication ports 302 for communicating with user devices and/or other devices. Communication ports may include such things as local area network adapters, wireless communication devices, Bluetooth technology, etc. The call router 102 also may include an internal clock element 304 to maintain an accurate time and date for the call router 102, create time stamps for communications received or sent by the call router 102, etc. The processor 300 may be adapted to implement or conduct one or more of the elements of the methods described herein.

If desired, the call router 102 may include one or more output devices 306 such as a printer, infrared or other transmitter, antenna, audio speaker, display screen or monitor, text to speech converter, etc., as well as one or more input devices 308 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the call router 102 may include a memory or data storage device 310 to store data, software, databases, communications, device drivers, call information, agent information, etc. The memory or data storage device 310 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The call router 102 also may include separate ROM 312 and RAM 314.

The processor 300 and the data storage device 310 in the call router 102 each may be, for example: (i) located entirely within a single computer or other computing device; or (ii) connected to each other by a remote communication medium, such as a serial port cable, telephone line or radio frequency transceiver. In one embodiment, the call router 102 may comprise one or more computers that are connected to a remote server computer for maintaining databases.

A conventional personal computer or workstation with sufficient memory and processing capability may be used as the call router 102. In one embodiment, the call router 102 operates as or includes a Web server for an Internet environment. The call router 102 may be capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 300. Other or equivalent processors may be available from Motorola, Inc., AMD, or Sun Microsystems, Inc. The processor 300 also may comprise one or more microprocessors, computers, computer systems, etc.

Software may be resident and operating or operational on the call router 102. The software may be stored on the data storage device 310 and may include a control program 316 for operating the server, databases, etc. The control program 316 may control the processor 300. The processor 300 preferably performs instructions of the control program 316, and thereby operates in accordance with the methods described in detail herein. The control program 316 may be stored in a compressed, uncompiled and/or encrypted format. The control program 316 furthermore includes program elements that may be necessary, such as an operating system, a database management system and device drivers for allowing the processor 300 to interface with peripheral devices, databases, etc. Appropriate program elements are known to those skilled in the art, and need not be described in detail herein.

The call router 102 also may include or store information regarding callers, calls, agents, agent stations, communications, etc. For example, information regarding one or more agents may be stored in an agent information database 318 for use by the call router 102 or another device or entity. Information regarding one or more agent stations may be stored in an agent station information database 320 for use by the call router 102 or another device or entity and information regarding one or more calls may be stored in a call information database 322 for use by the call router 102 or another device or entity. In some embodiments, some or all of one or more of the databases may be stored or mirrored remotely from the call router 102.

According to some embodiments, the instructions of the control program may be read into a main memory from another computer-readable medium, such as from the ROM 312 to the RAM 314. Execution of sequences of the instructions in the control program causes the processor 300 to perform the methods described herein. In alternative embodiments, hard-wired circuitry may be used in place of, or in combination with, software instructions for implementation of some or all of the methods described herein. Thus, embodiments are not limited to any specific combination of hardware and software.

The processor 300, communication port 302, clock 304, output device 306, input device 308, data storage device 310, ROM 312, and RAM 314 may communicate or be connected directly or indirectly in a variety of ways. For example, the processor 300, communication port 302, clock 304, output device 306, input device 308, data storage device 310, ROM 312, and RAM 314 may be connected via a bus 324.

While a specific implementation and hardware/software configurations for the call router device 102 has been illustrated, it should be noted that other implementations and hardware/software configurations are possible and that no specific implementation or hardware configuration is needed. Thus, not all of the components illustrated in FIG. 7 may be needed for a call router device implementing the methods disclosed herein.

As illustrated above, in some embodiments, an agent selection system may include a processor; a communication port coupled to the processor; and a storage device coupled to the processor and storing instructions adapted to be executed by the processor to determine an off process time for each of a plurality of agents; and route an incoming call to a first available agent in the plurality of agents, wherein the first available agents has an off process time that is higher than other available agents in the plurality of agents. In some other embodiments, an agent selection system may include a processor; a communication port coupled to the processor; and a storage device coupled to the processor and storing instructions adapted to be executed by the processor to assign a priority to each of a plurality of agents; and route an incoming call to a first available agent in the plurality of agents, wherein the first available agents has a priority that is higher than other available agents in the plurality of agents. In some further embodiments, an agent selection system may include a processor; a communication port coupled to the processor; and a storage device coupled to the processor and storing instructions adapted to be executed by the processor to establish a first group of agents; establish a second group of agents; route an incoming call to an available agent in the first group of agents if an available agent exists in the first group of agents or routing the call to an available agent in the second group if no available agents exist in the first group.

In some embodiments, the methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences and the claims should not be construed as being limited to any particular order or sequence, unless specifically indicated.

In some embodiments, each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although various embodiments have been described herein, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for selecting an agent for a call, comprising:
   determining an off process time for each of a plurality of agents, wherein an off process time for an agent includes time that said agent has been on hold plus time that said agent has been idle; and
   routing an incoming call to a first available agent in said plurality of agents, wherein said first available agents has an off process time that is higher than other available agents in said plurality of agents.

2. The method of claim 1, wherein said determining an off process time for each of a plurality of agents includes determining an off process time for each of a plurality of agents after receiving said incoming call.

3. The method of claim 1, wherein said determining an off process time for each of a plurality of agents includes determining how much off process time each agent in said plurality of agents has had during a time period.

4. The method of claim 1, wherein said first available agent has an off process time higher than all other available agents in said plurality of agents.

5. The method of claim 1, further comprising:
   determining that said first available agent has a higher off process time than any other available agent in said plurality of agents.

6. The method of claim 1, further comprising:
   determining that an agent is needed to handle said incoming call.

7. The method of claim 1, further comprising:
   receiving said incoming call.

8. The method of claim 1, further comprising:
   skipping a second available agent to handle said incoming call, said second available agent having an off process time that is higher than said first available agent's off process time and said second available agent being one of said plurality of agents.

9. The method of claim 1, wherein said determining an off process time for each of a plurality of agents includes determining an off process time only for available agents.

10. A method for selecting an agent for a call, comprising:
    assigning a priority to each of a plurality of agents; and
    routing an incoming call to a first available agent in said plurality of agents, wherein said first available agents has a priority that is higher than other available agents in said plurality of agents, wherein said priority assigned to each of said plurality of agents based on an off process time and said off process time includes an idle time and a hold time for each of said plurality of agents.

11. The method of claim 10, determining that said first available agent has a higher priority than any other available agent in said plurality of agents.

12. The method of claim 10, further comprising:
    skipping a second available agent to handle said incoming call, said second available agent having a priority that is higher than said first available agent's priority and said second available agent being one of said plurality of agents.

13. The method of claim 10, wherein said routing said call to an available agent in said first group includes routing said call to a first available agent in said first group having an off process time higher than other agents in said group.

14. The method of claim 13, further comprising:
    skipping a second available agent in said first group to handle said incoming call, said second available agent having an off process time that is higher than said first available agent's off process time.

15. The method of claim 10, wherein said routing said call to an available agent in said first group includes routing said call to a first available agent in said first group having an off process time higher than all other agents in said group.

16. The method of claim 10, wherein said routing said call to an available agent in said first group includes routing said call to a first available agent in said first group having an off process time ratio lower than other agents in said first group.

17. The method of claim 16, further comprising:
    skipping a second available agent in said first group to handle said incoming call, said second available agent having an off process time ratio that is lower than said first available agent's off process time ratio.

18. The method of claim 10, wherein said routing said call to an available agent in said first group includes routing said call to a first available agent in said first group having an off process time ratio lower than all other agents in said first group.

19. The method of claim 15, further comprising:
    determining a time to answer for said first group.

20. A method for selecting an agent for a call, comprising:
    establishing a first group of agents;
    establishing a second group of agents;

determining an off process time for each of a plurality of agents, wherein said off process time includes an idle time and a hold time for each of said plurality of agents; and routing an incoming call to an available agent in said first group of agents if an available agent exists in said first group of agents or routing said call to an available agent in said second group if no available agents exist in said first group, wherein said available agent said first and said second group of agents has an off process time that is higher than other available agents in said plurality of agents in said first and said second group of agents, respectively.

21. The method of 20, further comprising:
assigning a priority to each agent in said second group of agents.

22. The method of claim 21, wherein said routing said call to a available agent in said second group if no available agent exists in said first group includes routing said call to a first available agent in said second group having a priority higher than other agents in said second group.

23. The method of claim 22, further comprising:
skipping a second available agent in said second group to handle said incoming call, said second available agent having a priority that is higher than said first available agent's priority.

24. The method of claim 21, wherein said routing said call to an available agent in said second group if no available agent exists in said first group includes routing said call to an available agent in said second group having a priority higher than all other available agents in said second group.

25. The method of 24, further comprising:
assigning a priority to each agent in said first group of agents.

26. The method of claim 25, wherein said routing said call to an available agent in said first group includes routing said call to a first available agent in said first group having a priority higher than other agents in said first group.

27. The method of claim 26, further comprising:
skipping a second available agent in said first group to handle said incoming call, said second available agent having a priority that is higher than said first available agent's priority.

28. The method of claim 25, wherein said routing said call to an available agent in said first group includes routing said call to an available agent in said first group having a priority higher than all other available agents in said first group.

29. The method of claim 20, further comprising:
assigning a priority to each agent in said first group of agents.

30. The method of claim 29, wherein said routing said call to an available agent in said first group includes routing said call to a first available agent in said first group having a priority higher than other agents in said first group.

31. The method of claim 30, further comprising:
skipping a second available agent in said first group to handle said incoming call, said second available agent having a priority that is higher than said first available agent's priority.

32. The method of claim 29, wherein said routing said call to an available agent in said first group includes routing said call to an available agent in said first group having a priority higher than all other available agents in said first group.

33. The method of claim 30, further comprising:
assigning a priority to each agent in said second group of agents.

34. The method of claim 33, wherein said routing said call to an available agent in said second group includes routing said call to a first available agent in said second group having a priority higher than other agents in said second group.

35. The method of claim 34, further comprising:
skipping a second available agent in said second group to handle said incoming call, said second available agent having a priority that is higher than said first available agent's priority.

36. The method of claim 33, wherein said routing said call to an available agent in said second group includes routing said call to an available agent in said second group having a priority higher than all other available agents in said second group.

37. The method of claim 20, further comprising:
determining an off process time for each agent in said first group.

38. The method of claim 37, wherein said routing said call to an available agent in said first group includes routing said call to a first available agent in said first group having an off process time higher than other agents in said first group.

39. The method of claim 38, further comprising:
skipping a second available agent in said first group to handle said incoming call, said second available agent having an off process time that is higher than said first available agent's off process time.

40. The method of claim 37, wherein said routing said call to an available agent in said first group includes routing said call to a first available agent in said first group having an off process time higher than all other agents in said first group.

41. The method of claim 32, wherein said routing said call to an available agent in said second group occurs when said time to answer for said first group exceeds a designated threshold.

42. The method of claim 32, wherein no agent in said first group is available when said time to answer for said first group exceeds a designated threshold.

43. An agent selection system, comprising:
a processor;
a communication port coupled to said processor; and
a storage device coupled to said processor and storing instructions adapted to be executed by said processor to:
determine an off process time for each of a plurality of agents, wherein an off process time for an agent includes time that said agent has been on hold plus time that said agent has been idle; and
route an incoming call to a first available agent in said plurality of agents, wherein said first available agents has an off process time that is higher than other available agents in said plurality of agents.

44. An agent selection system, comprising:
a processor;
a communication port coupled to said processor; and
a storage device coupled to said processor and storing instructions adapted to be executed by said processor to:
assign a priority to each of a plurality of agents; and
route an incoming call to a first available agent in said plurality of agents, wherein said first available agents has a priority that is higher than other available agents in said plurality of agents, wherein said priority assigned to each of said plurality of agents based on an off process time and said off process time includes an idle time and a hold time for each of said plurality of agents.

45. An agent selection system, comprising:

a processor;

a communication port coupled to said processor; and a storage device coupled to said processor and storing instructions adapted to be executed by said processor to:

establish a first group of agents;

establish a second group of agents;

determine an off process time for each of a plurality of agents in said first and said second groups of agents, wherein said off process time includes an idle time and a hold time for each of said plurality of agents; and route an incoming call to an available agent in said first group of agents if an available agent exists in said first group of agents or routing said call to an available agent in said second group if no available agents exist in said first group, wherein said available agent said first and said second groups of agents has an off process time that is higher than other available agents in said plurality of agents in said first and said second groups of agents, respectively.

46. An article of manufacture, comprising:

a computer readable medium having stored thereon instructions which, when executed by a processor, cause said processor to:

determine an off process time for each of a plurality of agents, wherein an off process time for an agent includes time that said agent has been on hold plus time that said agent has been idle; and route an incoming call to a first available agent in said plurality of agents, wherein said first available agents has an off process time that is higher than other available agents in said plurality of agents.

47. An article of manufacture, comprising:

a computer readable medium having stored thereon instructions which, when executed by a processor, cause said processor to:

assign a priority to each of a plurality of agents; and route an incoming call to a first available agent in said plurality of agents, wherein said first available agents has a priority that is higher than other available agents in said plurality of agents, wherein said priority assigned to each of said plurality of agents based on an off process time and said off process time includes an idle time and a hold time for each of said plurality of agents.

48. An article of manufacture, comprising:

a computer readable medium having stored thereon instructions which, when executed by a processor, cause said processor to:

establish a first group of agents;

establish a second group of agents;

determine an off process time for each of a plurality of agents in said first and said second groups of agents, wherein said off process time includes an idle time and a hold time for each of said plurality of agents; and route an incoming call to an available agent in said first group of agents if an available agent exists in said first group of agents or routing said call to an available agent in said second group if no available agents exist in said first group, wherein said available agent said first and said second groups of agents has an off process time that is higher than other available agents in said plurality of agents in said first and said second groups of agents, respectively.

* * * * *